United States Patent
Uchino et al.

(10) Patent No.: US 12,470,289 B2
(45) Date of Patent: Nov. 11, 2025

(54) NON-TERRESTRIAL NETWORK DEFAULT VALUE CONFIGURATION

(71) Applicant: QUALCOMM Incorporated, San Diego, CA (US)

(72) Inventors: Toru Uchino, Zushi (JP); Bharat Shrestha, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 17/661,200

(22) Filed: Apr. 28, 2022

(65) Prior Publication Data

US 2023/0353236 A1 Nov. 2, 2023

(51) Int. Cl.
*H04W 84/06* (2009.01)
*H04B 7/185* (2006.01)

(52) U.S. Cl.
CPC ..... *H04B 7/18543* (2013.01); *H04B 7/18589* (2013.01); *H04W 84/06* (2013.01)

(58) Field of Classification Search
None
See application file for complete search history.

(56) References Cited

U.S. PATENT DOCUMENTS

| | | | | |
|---|---|---|---|---|
| 2022/0322459 A1* | 10/2022 | Zhou | | H04W 74/0866 |
| 2022/0408389 A1 | 12/2022 | Wang et al. | | |
| 2023/0327753 A1* | 10/2023 | Lin | | H04B 7/18545 370/316 |
| 2024/0114372 A1* | 4/2024 | Xu | | H04W 36/0085 |
| 2024/0121744 A1* | 4/2024 | Suh | | H04W 60/00 |

FOREIGN PATENT DOCUMENTS

| | | |
|---|---|---|
| CN | 111770565 A | 10/2020 |
| CN | 113747562 A | 12/2021 |
| WO | WO-2021109140 A1 | 6/2021 |
| WO | WO-2021164579 A1 | 8/2021 |
| WO | WO-2022155177 A1 | 7/2022 |
| WO | WO-2022160137 A1 * | 8/2022 ............ H04W 72/04 |

OTHER PUBLICATIONS

International Search Report and Written Opinion—PCT/US2023/019808—ISA/EPO—Oct. 6, 2023.

(Continued)

*Primary Examiner* — Scott M Sciacca
(74) *Attorney, Agent, or Firm* — Harrity & Harrity, LLP

(57) ABSTRACT

Various aspects of the present disclosure generally relate to wireless communication. In some aspects, a user equipment (UE) may select a default value for a radio parameter used for communicating with a network node based at least in part on whether the network node is a terrestrial network (TN) node or a non-terrestrial network (NTN) node, an orbit type associated with the network node, or a coverage type associated with the network node. The UE may transmit a communication, e.g., to the network node based at least in part on the default value for the radio parameter. Numerous other aspects are described.

30 Claims, 11 Drawing Sheets

(56) References Cited

OTHER PUBLICATIONS

Convida Wireless: "NTN Indication and Idle Mode Enhancements", 3GPP TSG-RAN WG2 Meeting #113bis electronic, R2-2104147, 3rd Generation Partnership Project (3GPP), Mobile Competence Centre, 650, Route Des Lucioles, F-06921 Sophia-Antipolis Cedex, France, vol. RAN WG2, No. electronic, Apr. 12, 2021-Apr. 20, 2021, Apr. 2, 2021, 5 Pages, XP052175410, paragraph [0002].
Partial International Search Report—PCT/US2023/019808—ISA/EPO—Aug. 14, 2023.
Samsung: "RLC and PDCP Aspects for an NTN—Observations and Proposals", 3GPP TSG RAN WG2 Meeting #112, R2-2100253, 3rd Generation Partnership Project (3GPP), Mobile Competence Centre, 650, Route Des Lucioles, F-06921 Sophia-Antipolis Cedex, France, vol. RAN WG2, No. e-Meeting, Jan. 25, 2021-Feb. 5, 2021, Jan. 15, 2021, 4 Pages, XP051973454, paragraph [0002].

\* cited by examiner

NON-TERRESTRIAL NETWORK DEFAULT VALUE CONFIGURATION

FIELD OF THE DISCLOSURE

Aspects of the present disclosure generally relate to wireless communication and to techniques and apparatuses for non-terrestrial network default value configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include selecting a default value for a radio parameter used for communicating with a network node based at least in part on whether the network node is a terrestrial network (TN) node or a non-terrestrial network (NTN) node, an orbit type associated with the network node, or a coverage type associated with the network node. The method may include transmitting a communication to the network node based at least in part on the default value for the radio parameter.

Some aspects described herein relate to a method of wireless communication performed by a UE. The method may include detecting that a configuration that includes a radio resource control (RRC) configuration, a service data adaptation protocol (SDAP) configuration, a packet data convergence protocol (PDCP) configuration, a radio link control (RLC) configuration, a medium access control (MAC) configuration, or a physical layer configuration for communicating with a non-terrestrial network (NTN) node has not been received. The method may include modifying a behavior of the UE based at least in part on detecting that the configuration has not been received.

Some aspects described herein relate to an apparatus for wireless communication performed by a UE. The apparatus may include a memory and one or more processors, coupled to the memory. The one or more processors may be configured to select a default value for a radio parameter used for communicating with a network node based at least in part on whether the network node is a TN node or an NTN node, an orbit type associated with the network node, or a coverage type associated with the network node. The one or more processors may be configured to transmit a communication to the network node based at least in part on the default value for the radio parameter.

Some aspects described herein relate to an apparatus for wireless communication performed by a UE. The apparatus may include a memory and one or more processors, coupled to the memory. The one or more processors may be configured to detect that a configuration that includes an RRC configuration, an SDAP configuration, a PDCP configuration, an RLC configuration, a MAC configuration, or a physical layer configuration for communicating with an NTN node has not been received. The one or more processors may be configured to modify a behavior of the UE based at least in part on detecting that the configuration has not been received.

Some aspects described herein relate to a non-transitory computer-readable medium that stores a set of instructions for wireless communication by a UE. The set of instructions, when executed by one or more processors of the UE, may cause the UE to select a default value for a radio parameter used for communicating with a network node based at least in part on whether the network node is a TN node or an NTN node, an orbit type associated with the network node, or a coverage type associated with the network node. The set of instructions, when executed by one or more processors of the UE, may cause the UE to transmit a communication to the network node based at least in part on the default value for the radio parameter.

Some aspects described herein relate to a non-transitory computer-readable medium that stores a set of instructions for wireless communication by a UE. The set of instructions, when executed by one or more processors of the UE, may cause the UE to detect that a configuration that includes an RRC configuration, an SDAP configuration, a PDCP configuration, an RLC configuration, a MAC configuration, or a physical layer configuration for communicating with an NTN node has not been received. The set of instructions, when executed by one or more processors of the UE, may cause the UE to modify a behavior of the UE based at least in part on detecting that the configuration has not been received.

Some aspects described herein relate to an apparatus for wireless communication. The apparatus may include means for selecting a default value for a radio parameter used for communicating with a network node based at least in part on whether the network node is a TN node or an NTN node, an orbit type associated with the network node, or a coverage type associated with the network node. The apparatus may include means for transmitting a communication to the network node based at least in part on the default value for the radio parameter.

Some aspects described herein relate to an apparatus for wireless communication. The apparatus may include means for detecting that a configuration that includes an RRC configuration, an SDAP configuration, a PDCP configuration, an RLC configuration, a MAC configuration, or a physical layer configuration for communicating with an NTN node has not been received. The apparatus may include means for modifying a behavior of the apparatus based at least in part on detecting that the configuration has not been received.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
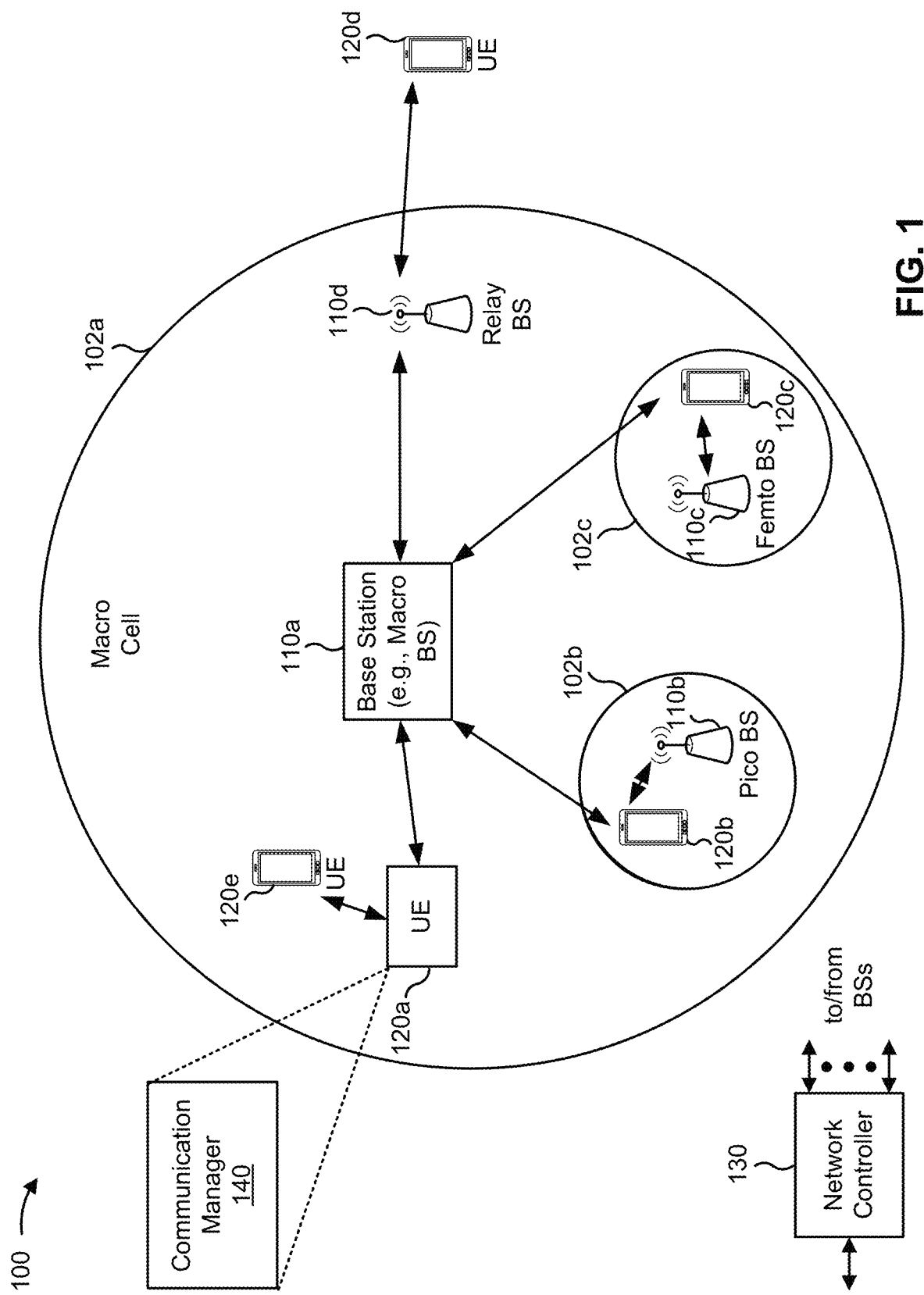
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although depicted as an integral unit in FIG. 1, aspects of the disclosure are not so limited. In some other aspects, the functionality of the base station 110 may be disaggregated according to an open radio access network (RAN) (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may select a default value for a radio parameter used for communicating with a network node based at least in part on whether the network node is a terrestrial network (TN) node or a non-terrestrial network (NTN) node, an orbit type associated with the network node, or a coverage type associated with the network node; and transmit a communication to the network node based at least in part on the default value for the radio parameter. Additionally, or alternatively, the communication manager 140 may perform one or more other operations described herein.

In some aspects, the communication manager 140 may detect that a configuration that includes an RRC configuration, an SDAP configuration, a PDCP configuration, an RLC configuration, a MAC configuration, or a physical layer configuration for communicating with an NTN node has not been received; and modify a behavior of the UE based at least in part on detecting that the configuration has not been received. Additionally, or alternatively, the communication manager 140 may perform one or more other operations described herein.

As indicated above, FIG. 1 is provided as an example. Other examples may differ from what is described with regard to FIG. 1.

Figure 2:
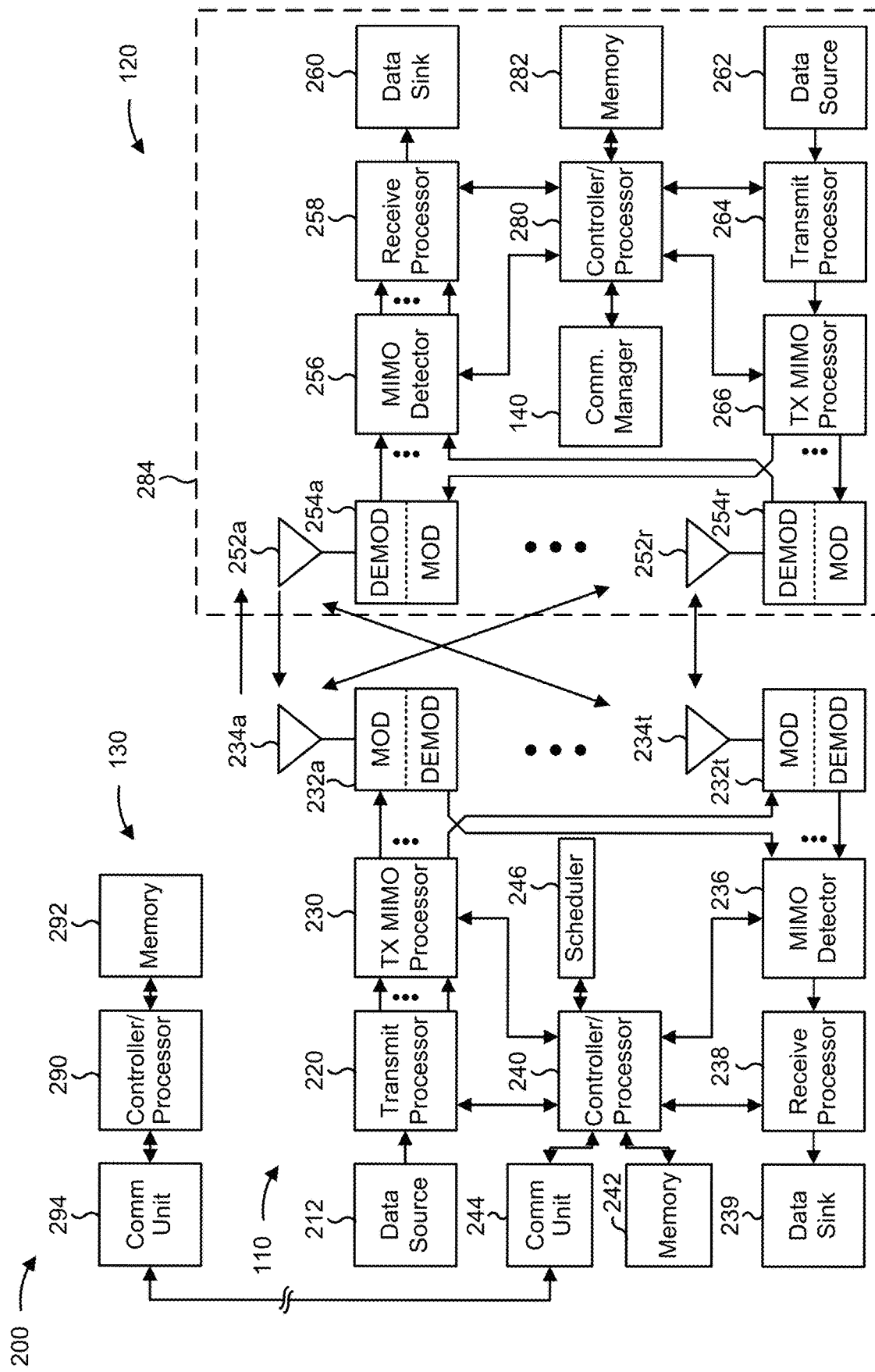
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with NTN default value configuration, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for selecting a default value for a radio parameter used for communicating with a network node based at least in part on whether the network node is a TN node or an NTN node, an orbit type associated with the network node, or a coverage type associated with the network node; and/or means for transmitting a communication to the network node based at least in part on the default value for the radio parameter. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for detecting that a configuration that includes an RRC configuration, an SDAP configuration, a PDCP configuration, an RLC configuration, a MAC configuration, or a physical layer configuration for communicating with an NTN node has not been received; and/or means for modifying a behavior of the UE based at least in part on detecting that the configuration has not been received. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
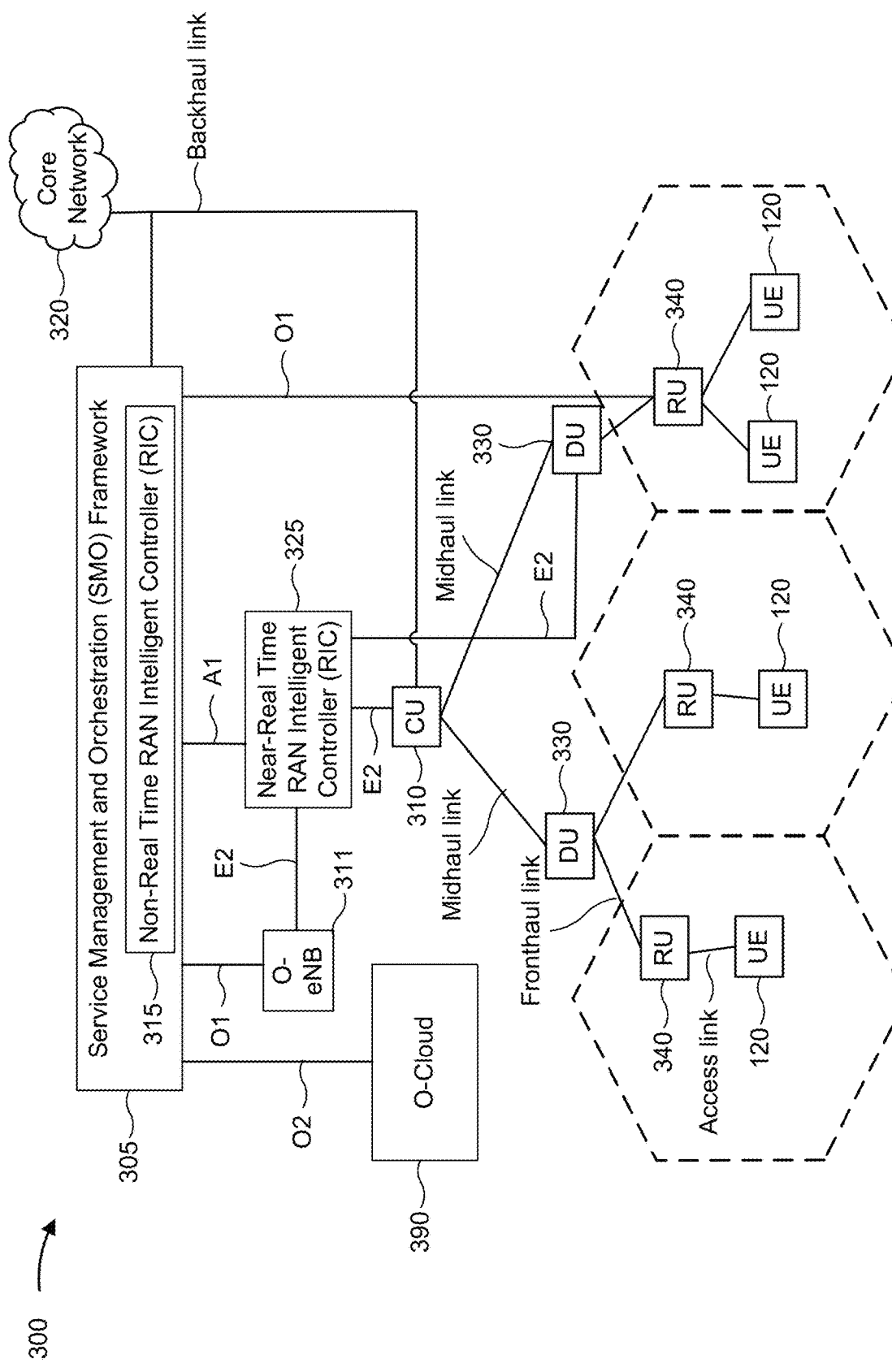
FIG. 3 is a diagram illustrating an example disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), PDCP, service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of an RLC layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML, models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
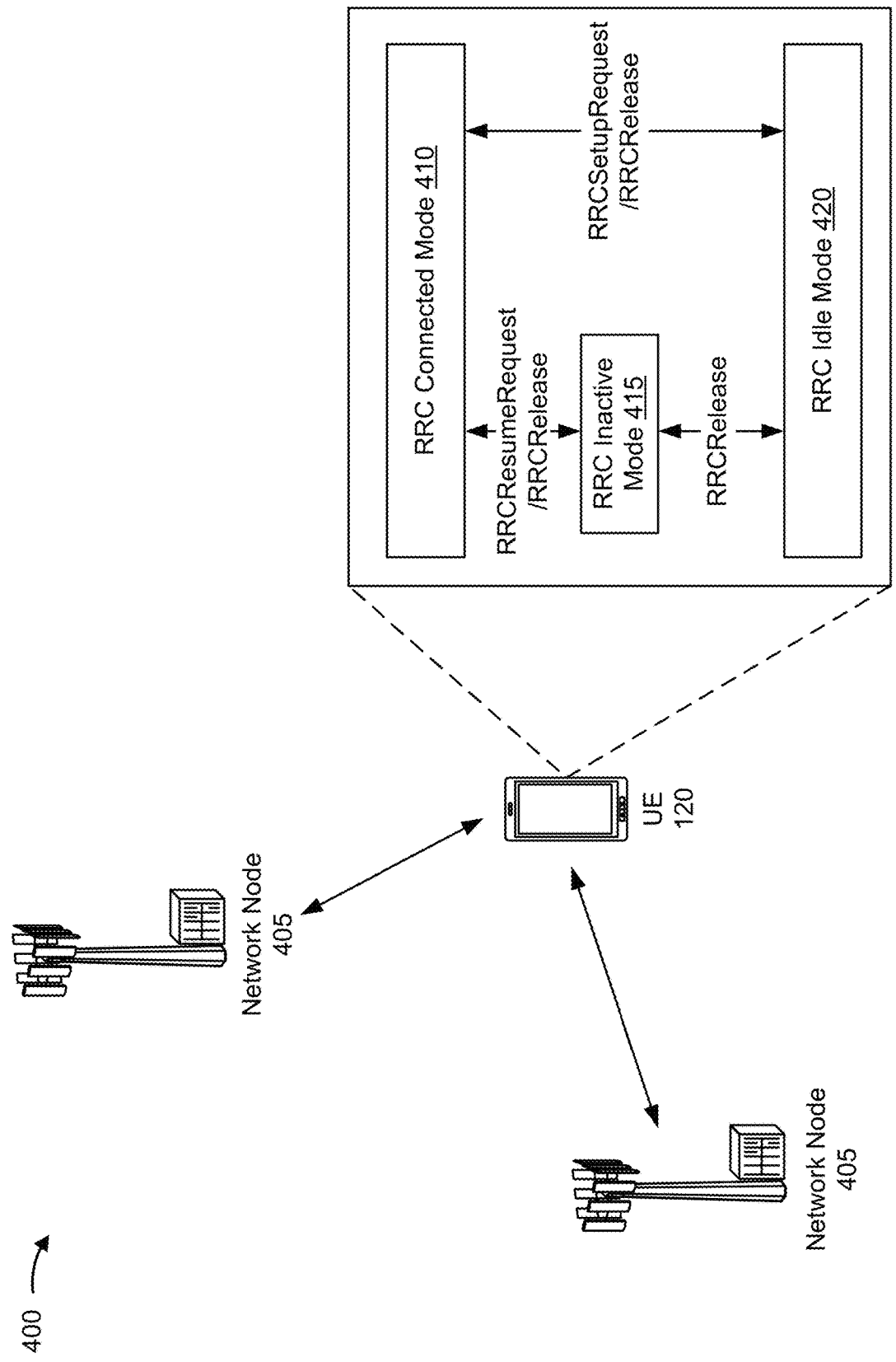
FIG. 4 is a diagram illustrating an example of wireless network in which the UE may support additional communication modes, in accordance with the present disclosure.

FIG. 4 illustrates an example 400 of a wireless network (e.g., wireless network 100) in which a UE (e.g., UE 120) may support additional communication modes, in accordance with the present disclosure. The UE 120 may communicate with a network node 405. The network node 405 may include some or all of the features of the base station 110, the CU 310, the DU 330, and/or the RU 340. The UE 120 may be communicatively connected with one or more network nodes 405 in the wireless network. For example, the UE 120 may be connected to the one or more network nodes 405 in a dual connectivity configuration. In this case, a network node 405 may serve the UE 120 as a primary node and a second network node 405 may serve the UE 120 as a secondary node.

As illustrated in FIG. 4, the UE 120 may support a connected communication mode (e.g., an RRC connected mode 410), an idle communication mode (e.g., an RRC idle mode 415), and an inactive communication mode (e.g., an RRC inactive mode 420). RRC inactive mode 420 may functionally reside between RRC connected mode 410 and RRC idle mode 415.

The UE 120 may transition between different modes based at least in part on various commands and/or communications received from the one or more network nodes 405. For example, the UE 120 may transition from RRC connected mode 410 or RRC inactive mode 420 to RRC idle mode 415 based at least in part on receiving an RRCRelease communication. As another example, the UE 120 may transition from RRC connected mode 410 to RRC inactive mode 420 based at least in part on receiving an RRCRelease with suspendConfig communication. As another example, the UE 120 may transition from RRC idle mode 415 to RRC connected mode 410 based at least in part on receiving an RRCSetupRequest communication. As another example, the UE 120 may transition from RRC inactive mode 420 to RRC connected mode 410 based at least in part on receiving an RRCResumeRequest communication.

When transitioning to RRC inactive mode 420, the UE 120 and/or the one or more network nodes 405 may store a UE context (e.g., an access stratum (AS) context and/or higher-layer configurations). This permits the UE 120 and/or the one or more network nodes 405 to apply the stored UE context when the UE transitions from RRC inactive mode 420 to RRC connected mode 410 in order to resume communications with the one or more network nodes, which reduces latency of transitioning to RRC connected mode 410 relative to transitioning to the RRC connected mode 410 from RRC idle mode 415.

In some cases, the UE 120 may communicatively connect with a new primary node when transitioning from RRC idle mode 415 or RRC inactive mode 420 to RRC connected mode 410 (e.g., a primary node that is different from the last serving primary node when the UE 120 transitioned to RRC idle mode 415 or RRC inactive mode 420). In this case, the new primary node may be responsible for identifying a secondary node for the UE 120 in the dual connectivity configuration.

In some cases, the UE 120 may be configured with a default value for a radio parameter, or a plurality of default values for a plurality of radio parameters. In some cases, the default value for the radio parameter may be used by the UE 120 for connecting to the network node 405, such as for Layer 1 (L1) and MAC cell configuration, and/or may be used by the UE 120 for transitioning from an idle mode to a connected mode (e.g., from the RRC idle mode 415 to the RRC connected mode 410). In some cases, the UE 120 may need to transmit information to the network node 405 and/or receive information from the network node 405 before a dedicated configuration is received. In this case, the UE 120 may use the default values in order to perform a connection procedure. In some cases, the default value for the radio parameter may be used to reduce network overhead. For example, the default value for the radio parameter may be used for PDCP configuration or RLC configuration procedures. Here, the UE 120 may configure a signaling radio bearer (SRB) with a specified PDCP or RLC configuration based at least in part on the network node 405 indicating to use the default value (e.g., rather than the network node 405 indicating the actual values and/or parameters to be used).

In some cases, the default value for the radio parameter may correspond to one or more default SRB configurations (e.g., as shown in Table 1), one or more default MAC cell group configuration indicators (e.g., shown in Table 2), or one or more default value timers or constants (e.g., shown in Table 3), among other examples.

TABLE 1

Default SRB Configurations

| Name | Value |
| --- | --- |
| PDCP-Config | SRB1 | SRB2 | SRB3 |
| >t-Reordering | infinity |
| RLC-Config CHOICE | Am |
| ul-RLC-Config | |
| >sn-FieldLength | size12 |
| >t-PollRetransmit | ms45 |
| >pollPDU | infinity |
| >pollByte | infinity |
| >maxRetxThreshold | t8 |
| dl-RLC-Config | |
| >sn-FieldLength | size 12 |
| >t-Reassembly | ms35 |
| >t-StatusProhibit | ms0 |
| logicalChannelIdentity | 1 | 2 | 3 |
| LogicalChannelConfig | [none] |
| >priority | 1 | 2 | 3 |
| >prioritisedBitRate | infinity |
| >logicalChannelGroup | 0 |

TABLE 2

Default MAC Cell Group Configuration

| Name | Value |
| --- | --- |
| MAC Cell Group configuration | [none] |
| bsr-Config | [none] |
| >periodicBSR-Timer | sf10 |
| >retxBSR-Timer | sf80 |
| phr-Config | [none] |
| >phr-PeriodicTimer | sf10 |
| >phr-ProhibitTimer | sf10 |
| >phr-Tx-PowerFactorChange | dB1 |

TABLE 3

Default values of timers and constants

| Name | Value |
| --- | --- |
| t310 | ms1000 |
| n310 | n1 |
| t311 | ms30000 |
| n311 | n1 |

The default values and radio parameters described above are provided for example only. In some cases, other parameters may be assigned a default value and/or other default values may be assigned for the identified parameters. In some cases, the UE 120 and/or the network node 405 may use the default values for other procedures, such as RRC connection establishment, reception of an RRC setup, a full configuration of the UE 120, actions following a cell selection, an RRC connection resume procedure, a handover procedure, an RLC bearer addition or modification, or an SRB addition or modification, among other examples.

As indicated above, FIG. 4 is provided as an example. Other examples may differ from what is described with regard to FIG. 4.

Figure 5:
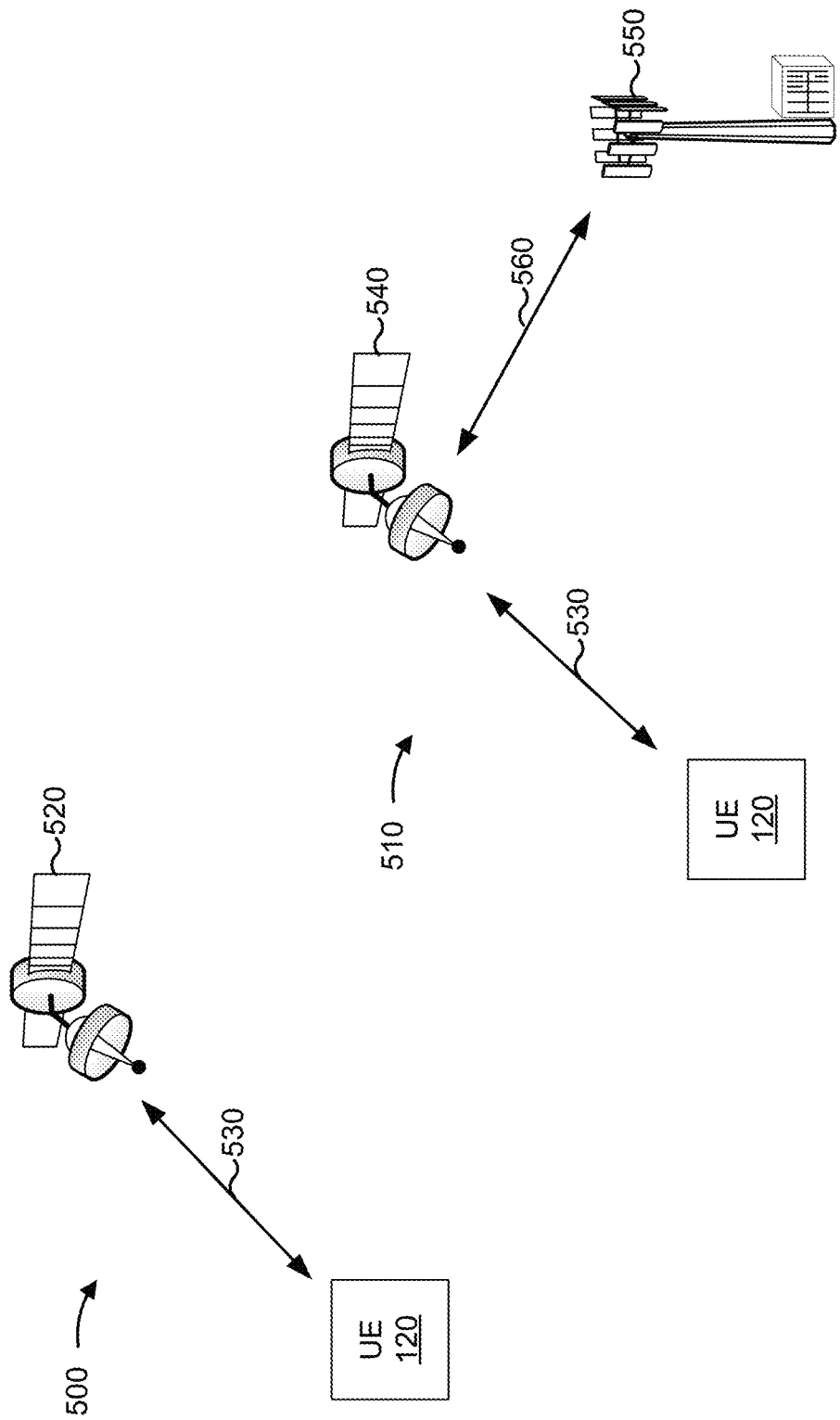
FIG. 5 is a diagram illustrating an example of regenerative satellite deployment and transparent satellite deployment in a non-terrestrial network (NTN), in accordance with the present disclosure.

FIG. 5 is a diagram illustrating an example 500 of a regenerative satellite deployment and an example 510 of a transparent satellite deployment in a non-terrestrial network (NTN), in accordance with the present disclosure.

Example 500 shows a regenerative satellite deployment. In example 500, a UE 120 is served by a satellite 520 via a service link 530. For example, the satellite 520 may include a BS 110 (e.g., BS 110*a*) or a gNB. In some aspects, the satellite 520 may be referred to as an NTN network node, a regenerative repeater, or an on-board processing repeater. In some aspects, the satellite 520 may demodulate an uplink radio frequency signal, and may modulate a baseband signal derived from the uplink radio signal to produce a downlink radio frequency transmission. The satellite 520 may transmit the downlink radio frequency signal on the service link 530. The satellite 520 may provide a cell that covers the UE 120.

Example 510 shows a transparent satellite deployment, which may also be referred to as a bent-pipe satellite deployment. In example 510, a UE 120 is served by a satellite 540 via the service link 530. The satellite 540 may be a transparent satellite. The satellite 540 may relay a signal received from gateway 550 via a feeder link 560. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 530 to a frequency of the uplink radio frequency transmission on the feeder link 560, and may amplify and/or filter the uplink radio frequency transmission. In some aspects, the UEs 120 shown in example 500 and example 510 may be associated with a Global Navigation Satellite System (GNSS) capability or a Global Positioning System (GPS) capability, though not all UEs have such capabilities. The satellite 540 may provide a cell that covers the UE 120.

The service link 530 may include a link between the satellite 540 and the UE 120, and may include one or more of an uplink or a downlink. The feeder link 560 may include a link between the satellite 540 and the gateway 550, and may include one or more of an uplink (e.g., from the UE 120 to the gateway 550) or a downlink (e.g., from the gateway 550 to the UE 120). An uplink of the service link 530 may be indicated by reference number 530-U (not shown in FIG. 5) and a downlink of the service link 530 may be indicated by reference number 530-D (not shown in FIG. 5). Similarly, an uplink of the feeder link 560 may be indicated by reference number 560-U (not shown in FIG. 5) and a downlink of the feeder link 560 may be indicated by reference number 560-D (not shown in FIG. 5).

The feeder link 560 and the service link 530 may each experience Doppler effects due to the movement of the satellites 520 and 540, and potentially movement of a UE 120. These Doppler effects may be significantly larger than in a terrestrial network (TN). The Doppler effect on the feeder link 560 may be compensated for to some degree, but may still be associated with some amount of uncompensated frequency error. Furthermore, the gateway 550 may be associated with a residual frequency error, and/or the satellite 520/540 may be associated with an on-board frequency error. These sources of frequency error may cause a received downlink frequency at the UE 120 to drift from a target downlink frequency.

In some cases, the default values described above may be configured for TN communications. However, the default values may not be suitable for NTN communications. For example, the round trip time (RTT) for communications between the UE 120 and an NTN node may be longer than the RTT for communications between the UE 120 and a TN node. In some cases, the UE 120 may perform one or more operations for NTN communications based at least in part on the default values defined for the TN operations.

In a first example, a default value may be defined for a retransmission buffer status report (BSR) timer (e.g., the retxBSR-Timer described in TS 38.321). The retransmission BSR timer may start or restart based at least in part on reception of an uplink grant for a data transmission. In some cases, the UE 120 may trigger a regular BSR transmission (if there is data to be transmitted) based at least in part on an expiration of the retransmission BSR timer. In some cases, if the value for the retransmission BSR timer expiration is too short, the UE 120 may trigger another random access procedure or RRC re-establishment procedure. For example, after transmitting a physical uplink shared channel (PUSCH) message (e.g., a Msg3), but prior to transmitting a physical downlink control channel (PDCCH) or physical downlink shared channel (PDSCH) contention resolution message (e.g., a Msg4), the UE 120 may (unnecessarily) trigger another random access procedure or RRC re-establishment procedure.

In a second example, a default value may be defined for a poll retransmit timer (e.g., the t-PollRetransmit timer described in TS 38.322). The poll retransmit timer may start or restart based at least in part on a polling operation. In some cases, the UE 120 may trigger a polling operation based at least in part on an expiration of the poll retransmit timer. In some cases, if the value for the poll retransmit timer expiration is too short, the UE 120 may perform unnecessary RLC retransmissions (e.g., in uplink) when the network does not provide the configuration explicitly.

In a third example, a default value may be defined for a reassembly timer (e.g., the t-Reassembly timer described in TS 38.322). The reassembly timer may start or restart based at least in part on a sequence number gap detection. In some cases, the UE 120 may trigger an RLC status report based at least in part on an expiration of the reassembly timer. In some cases, if the value for the reassembly timer expiration is too short, the UE 120 may trigger unnecessary status report transmission (e.g., in uplink) when the network does not provide the configuration explicitly.

In some cases, the default values configured for TN communications may not be suitable for NTN communications. For example, the RTT for communications between the UE 120 and an NTN node may be longer than the RTT for communications between the UE 120 and a TN node. In some cases, the UE 120 may perform one or more operations for NTN communications based at least in part on the default values defined for the TN operations. As described in the examples above, this may result in increased network overhead (e.g., wasted system resources) and/or communication disruptions between the UE 120 and the network node 405.

Techniques and apparatuses are described herein for NTN default value configuration. In some aspects, the UE 120 may select a default value for a radio parameter used for communicating with a network node based at least in part on whether the network node is a TN node or an NTN node, an orbit type associated with the network node, or a coverage type associated with the network node. The UE 120 may transmit a communication to the network node based at least in part on the default value for the radio parameter. In some aspects, the UE 120 may detect that a configuration that includes an RRC configuration, an SDAP configuration, a PDCP configuration, an RLC configuration, a MAC configuration, or a physical layer configuration for communicating with an NTN node has not been received. The UE 120 may modify a behavior of the UE 120 based at least in part on detecting that the configuration has not been received.

As described above, the default values configured for TN communications may not be suitable for NTN communications. This may result in increased network overhead and/or communication disruptions between the UE 120 and the network node 405. Using the techniques and apparatuses described herein, the UE 120 may be configured with multiple default values, and may select one or more of the default values to be used based at least in part on a characteristic of the network node 405. Alternatively, the UE 120 may modify a behavior of the UE 120 based at least in part on detecting that the PDCP configuration, the RLC configuration, or the MAC configuration has not been received. This may decrease a likelihood of wasted network resources and communication disruptions.

As indicated above, FIG. 5 is provided as an example. Other examples may differ from what is described with regard to FIG. 5.

Figure 6:
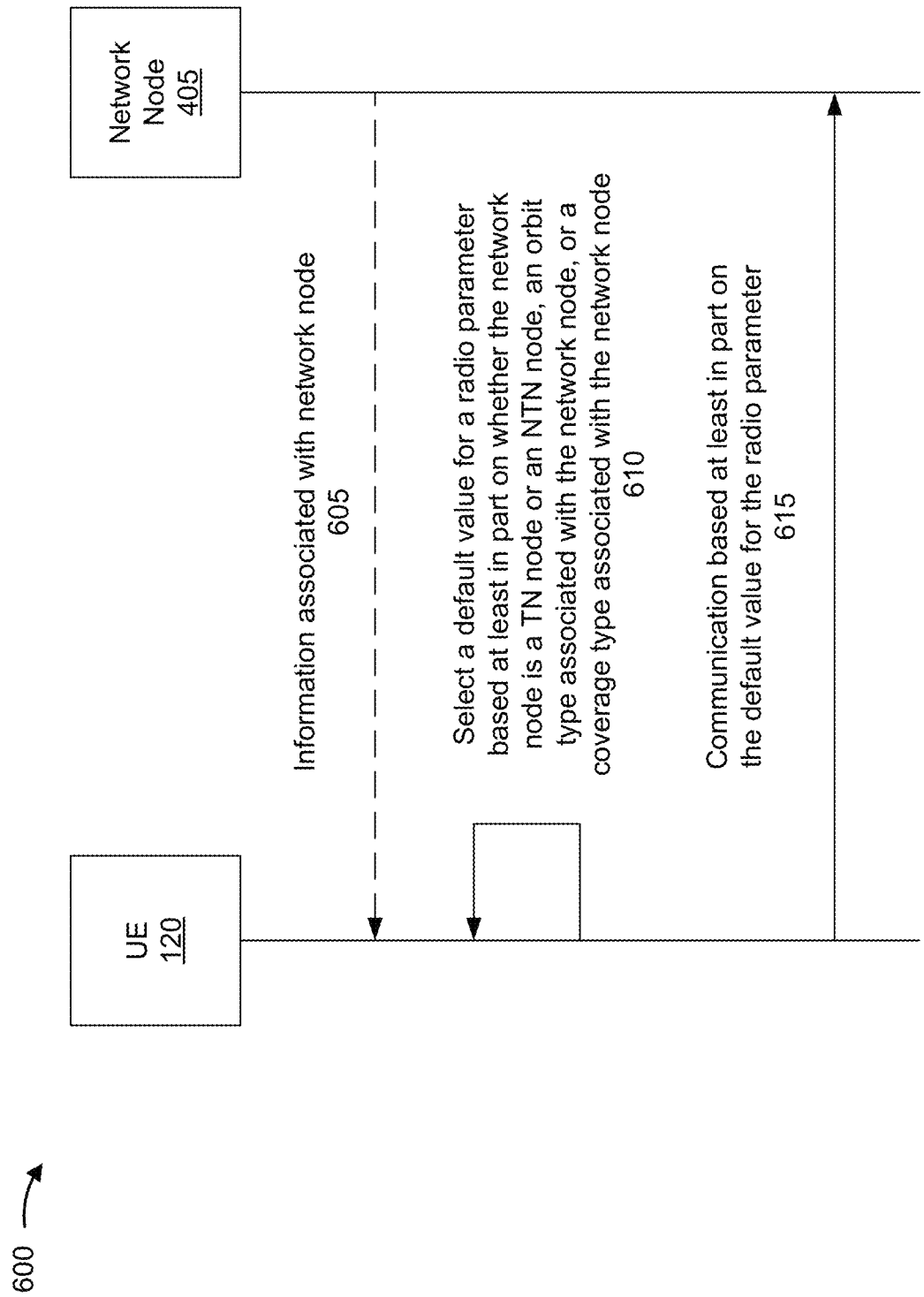
FIG. 6 is a diagram illustrating an example associated with NTN default value configuration, in accordance with the present disclosure.

FIG. 6 is a diagram illustrating an example 600 of NTN default value configuration, in accordance with the present disclosure. The UE 120 may communicate with the network node 405. The network node 405 may be a TN node or an NTN node, among other examples.

As shown in connection with reference number 605, the network node 405 may transmit, and the UE 120 may receive, information associated with the network node 405. For example, the network node 405 may indicate whether the network node 405 is a TN node or an NTN node, an orbit type associated with the network node 405, or a coverage type associated with the network node 405, among other examples. Additional details regarding these features are described below.

As shown in connection with reference number 610, the UE 120 may select a default value for a radio parameter used for communicating with the network node 405. For example, the UE 120 may select the default value for the radio parameter based at least in part on whether the network node 405 is a TN node or an NTN node, the orbit type associated with the network node 405, or the coverage type associated with the network node 405.

In some aspects, the UE 120 may identify whether the network node 405 is a TN node or an NTN node. In some aspects, the UE 120 may identify whether the network node 405 is a TN node or an NTN node based at least in part on a latency value. For example, if a latency between the UE 120 and the network node 405 is less than, or less than or equal to, a latency threshold, the UE 120 may determine that the network node 405 is the TN node. Alternatively, if the latency between the UE 120 and the network node 405 is greater than, or greater than or equal to, the latency threshold, the UE 120 may determine that the network node 405 is the NTN node. In some aspects, a longer value of Layer 2 (L2) timers may be considered for NTN communications. Since an NTN node is located at a greater distance from the UE 120 than a TN node is from the UE 120, the latency between the UE 120 and an NTN node may be greater than the latency between the UE 120 and a TN node. Therefore, a longer L2 timer value may be needed.

In some aspects, the network node 405 may explicitly indicate whether the network node 405 is a TN node or an NTN node. For example, the network node 405 may transmit, and the UE 120 may receive, an indication that the network node 405 is the TN node or an indication that the network node 405 is the NTN node. In some aspects, the network node 405 may indicate whether the network node 405 is a TN node or an NTN node using system information block (SIB) signaling. In some aspects, the UE 120 may identify whether the network node 405 is a TN node or an NTN node based at least in part on an implicit detection. For example, the UE 120 may determine whether the network node 405 is a TN node or an NTN node based at least in part on the type of SIB signaling. In another example, the UE 120 may determine whether the network node 405 is a TN node or an NTN node based at least in part on timing information, such as a measured RTT of a communication between the UE 120 and the network node 405, a measured one-way delay of the communication between the UE 120 and the network node 405, or a timing advance (TA) value (e.g., commonTA or TA command) of the communication between the UE 120 and the network node 405.

In some aspects, the UE 120 may identify an orbit type associated with the network node 405. In some aspects, the network node 405 may have a geostationary earth orbit (GSO), a highly elliptical orbit (HEO), a medium earth orbit (MEO), a low earth orbit (LEO), a high-altitude platform station (HAPS) orbit, a geosynchronous orbit (GSO), or a non-geosynchronous orbit (NGSO), among other examples. In some aspects, a latency associated with a first orbit type may be greater than a latency for a second orbit type. For example, a latency for an NTN node having the GSO type may be greater than a latency for an NTN node having the LEO type. In some aspects, the UE 120 may determine the orbit type based at least in part on the latency. For example, the UE 120 may be configured with a latency value (or range of latency values), such as an L2 timer value (or range of L2 timer values) associated with one or more of the orbit types. The UE 120 may determine the orbit type of the network node 405 based at least in part on a corresponding latency value of a communication received from the network node 405.

In some aspects, the network node 405 may explicitly indicate the orbit type of the network node 405. For example, the network node 405 may transmit, and the UE 120 may receive, an indication of the orbit type of the network node 405. In some aspects, the network node 405 may transmit an indication that the network node 405 has the GSO, the HEO, the MEO, the LEO, the HAPS, the GSO, or the NGSO orbit type. In some aspects, the UE 120 may determine the orbit type of the network node 405 based at least in part on an implicit detection. For example, the UE 120 may determine the orbit type of the network node 405 based at least in part on a type of SIB signaling. In another example, the UE 120 may determine the orbit type of the network node 405 based at least in part on timing information, such as a measured RTT of a communication between the UE 120 and the network node 405, a measured one-way delay of the communication between the UE 120 and the network node 405, or a TA value of the communication between the UE 120 and the network node 405.

In some aspects, the UE 120 may identify whether the network node 405 uses continuous coverage or discontinuous coverage. In some aspects, since temporary out-of-sync conditions may occur for discontinuous coverage, longer or larger timer values (e.g., n310 timer or t310 timer) may be considered for the discontinuous coverage scenarios. In some aspects, the UE 120 may identify the coverage type based at least in part on the timer value. For example, the UE 120 may determine that the network node 405 uses continuous coverage type based at least in part on the timer value being less than, or less than or equal to, a timer value threshold. Alternatively, the UE 120 may determine that the network node 405 uses discontinuous coverage type based at least in part on the timer value being greater than, or greater than or equal to, the timer value threshold.

In some aspects, the network node 405 may explicitly indicate whether the network node 405 uses the continuous coverage or the discontinuous coverage. For example, the network node 405 may transmit, and the UE 120 may receive, an indication that the network node 405 uses the continuous coverage or an indication that the network node 405 uses the discontinuous coverage. In some aspects, the UE 120 may determine the coverage type of the network node 405 based at least in part on an implicit detection. For example, the UE 120 may determine the coverage type of the network node 405 based at least in part on an indication of the orbit type. In some aspects, one or more first orbit types may be associated with continuous coverage by the network node 405, and one or more second orbit types may be associated with discontinuous coverage by the network node 405. For example, GSO or HEO types may be associated with continuous coverage by the network node 405, while LEO or NGSO types may be associated with discontinuous coverage by the network node 405.

In some aspects, different identification methods may be used for identifying different characteristics of the network node 405. For example, a first identification method may be used for identifying whether the network node 405 is a TN node or an NTN node, a second identification method may be used for identifying the orbit type of the network node 405, and a third identification method (or the first or second identification methods) may be used for identifying the coverage type of the network node 405. In one example, implicit detection (e.g., based on RTT information) may be used to identify whether the network node 405 is a TN node or an NTN node, whereas the orbit type of the network node 405 may be determined based at least in part on an explicit indication from the network node 405.

In some aspects, the UE 120 may obtain (e.g., determine) the default value for the radio parameter. In some aspects, the UE 120 may obtain an absolute value for the default value. For example, the UE 120 may obtain the actual value to be used for the default value for the radio parameter. In some aspects, the default value may be defined based at least in part on a latency value, or may be defined as the largest possible value (e.g., infinity) or the largest value in the range of possible values for the parameter.

In some aspects, obtaining the default value for the radio parameter may include obtaining an offset value. In this case, the UE 120 may determine the default value for the NTN based at least in part on adding the offset value to an existing default value, such as a TN default value. In some aspects, the UE 120 may use the resulting value (from adding the offset value to the existing value) or may select a nearest value in the range of values for the parameter. In some aspects, the offset value may be based at least in part on a latency value or other timing information such as an RTT, a one-way delay time, or a TA value.

In some aspects, obtaining the default value for the radio parameter may include obtaining a scaling factor. In this case, the UE 120 may determine the default value for the NTN based at least in part on multiplying an existing default value, such as the default value for the TN, by the scaling factor. In some aspects, the UE 120 may use the resulting value (from multiplying the existing value by the scaling factor) or may select a nearest value in the range of values for the parameter. In some aspects, the scaling factor may be based at least in part on a latency value or other timing information such as an RTT, a one-way delay time, or a TA value.

In some aspects, the UE 120 may obtain the default value for the NTN based at least in part on a combination of the absolute value, the offset value, or the scaling factor. For example, the UE 120 may determine the default value for the NTN based at least in part on a combination of the offset value and the scaling factor. In some aspects, the UE 120 may use the resulting value (from adding the offset value to the default value and multiplying by the scaling factor) or may select a nearest value in the range of values for the parameter.

In some aspects, different values may be defined for different orbit types. For example, an absolute value may be defined for a first orbit type, an offset may be defined for a second orbit type, and/or a scaling factor may be defined for a third orbit type. In some aspects, different values may be defined for different parameter types. For example, a first absolute value may be defined for the continuous coverage and a second absolute value may be defined for the discontinuous coverage, while an offset and/or a scaling factor may be provided for the orbit type (or different offsets and/or scaling factors may be provided for different orbit types).

In some aspects, the network node 405 may select the default value to be used for the radio parameter. In this case, the network node 405 may be configured with multiple default values for the radio parameter, or multiple sets of default values for the radio parameter. For example, different default values, or different sets of default values, may be defined for different types of UEs. In one example, a first default value or set of default values may be indicated for a first type of UE 120 (e.g., a smartphone) while a second default value or set of default values may be indicated for a second type of UE 120 (e.g., a reduced capability UE).

In some aspects, the network node 405 may transmit an indication of which default value or set of default values is to be used for the radio parameter. For example, the network node 405 may transmit, and the UE 120 may receive, an indication of which default value or set of default values is to be used for the radio parameter. In some aspects, the network node 405 may transmit SIB signaling, RRC information, random access response (RAR) information, MAC information (e.g., a MAC control element (MAC-CE)), or downlink control information (DCI) that indicates the default value or set of default values to be used for the radio parameter.

In some aspects, the UE 120 may apply the default value indicated by the network node 405. For example, the UE 120 may receive the indication of the default value from the network node 405, and may use the received default value for the radio parameter. In some aspects, a default index (e.g., index 0) may be used based at least in part on a default value not being selected for the radio parameter. In some aspects, the UE 120 may be configured to use an existing default value (e.g., a default value defined for the TN) based at least in part on not receiving an indication of the default value from the network node 405.

As shown in connection with reference number 615, the UE 120 may transmit, and the network node 405 may receive, a communication that is based at least in part on the default value for the radio parameter. For example, the UE 120 may select the default value for the radio parameter, such as a timer expiration parameter. The UE 120 may transmit a communication, such as a communication associated with random access triggering, based at least in part on an expiration of the timer that is configured with the default value for the timer expiration.

As described above, the default values configured for TN communications may not be suitable for NTN communications. This may result in increased network overhead and/or communication disruptions between the UE 120 and the network node 405. Using the techniques and apparatuses described herein, the UE 120 may be configured with multiple default values, and may select one or more of the default values to be used based at least in part on a characteristic of the network node 405. This may decrease a likelihood of wasted network resources and communication disruptions.

As indicated above, FIG. 6 is provided as an example. Other examples may differ from what is described with regard to FIG. 6.

Figure 7:
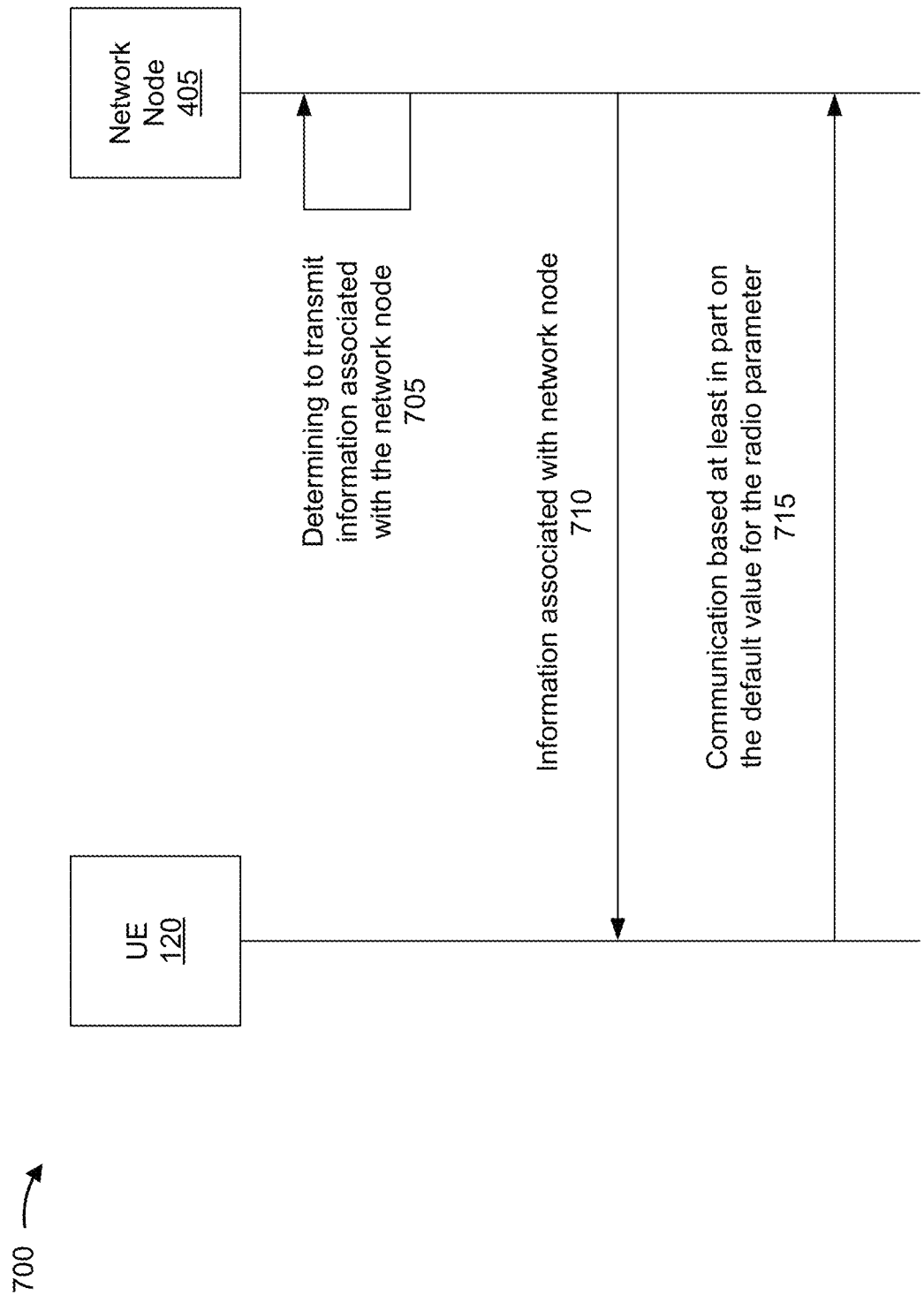
FIG. 7 is a diagram illustrating an example associated with NTN default value configuration, in accordance with the present disclosure.

FIG. 7 is a diagram illustrating an example 700 of NTN default value configuration, in accordance with the present disclosure.

As shown in connection with reference number 705, the network node 405 may determine to transmit information associated with the network node 405. For example, the network node 405 may determine whether the network node 405 is a TN node or an NTN node, an orbit type associated with the network node 405, or a coverage type associated with the network node 405, among other examples. Additional details regarding these features are described below.

In some aspects, the network node 405 may explicitly indicate whether the network node 405 is a TN node or an NTN node. For example, the network node 405 may transmit, and the UE 120 may receive, an indication that the network node 405 is the TN node or an indication that the network node 405 is the NTN node. In some aspects, the network node 405 may indicate whether the network node 405 is a TN node or an NTN node using system information block (SIB) signaling. In some aspects, the UE 120 may identify whether the network node 405 is a TN node or an NTN node based at least in part on an implicit detection. For example, the UE 120 may determine whether the network node 405 is a TN node or an NTN node based at least in part on the type of SIB signaling. In another example, the UE 120 may determine whether the network node 405 is a TN node or an NTN node based at least in part on timing information, such as a measured RTT of a communication between the UE 120 and the network node 405, a measured one-way delay of the communication between the UE 120 and the network node 405, or a timing advance (TA) value (e.g., commonTA or TA command) of the communication between the UE 120 and the network node 405.

In some aspects, the network node 405 may explicitly indicate the orbit type of the network node 405. For example, the network node 405 may transmit, and the UE 120 may receive, an indication of the orbit type of the network node 405. In some aspects, the network node 405 may transmit an indication that the network node 405 has the GSO, the HEO, the MEO, the LEO, the HAPS, the GSO, or the NGSO orbit type. In some aspects, the UE 120 may determine the orbit type of the network node 405 based at least in part on an implicit detection. For example, the UE 120 may determine the orbit type of the network node 405 based at least in part on a type of SIB signaling. In another example, the UE 120 may determine the orbit type of the network node 405 based at least in part on timing information, such as a measured RTT of a communication between the UE 120 and the network node 405, a measured one-way delay of the communication between the UE 120 and the network node 405, or a TA value of the communication between the UE 120 and the network node 405.

In some aspects, the network node 405 may explicitly indicate whether the network node 405 uses the continuous coverage or the discontinuous coverage. For example, the network node 405 may transmit, and the UE 120 may receive, an indication that the network node 405 uses the continuous coverage or an indication that the network node 405 uses the discontinuous coverage. In some aspects, the UE 120 may determine the coverage type of the network node 405 based at least in part on an implicit detection. For example, the UE 120 may determine the coverage type of the network node 405 based at least in part on an indication of the orbit type. In some aspects, one or more first orbit types may be associated with continuous coverage by the network node 405, and one or more second orbit types may be associated with discontinuous coverage by the network node 405. For example, GSO or HEO types may be associated with continuous coverage by the network node 405, while LEO or NGSO types may be associated with discontinuous coverage by the network node 405.

In some aspects, the network node 405 may select the default value to be used for the radio parameter. In this case, the network node 405 may be configured with multiple default values for the radio parameter, or multiple sets of default values for the radio parameter. For example, different default values, or different sets of default values, may be defined for different types of UEs. In one example, a first default value or set of default values may be indicated for a first type of UE 120 (e.g., a smartphone) while a second default value or set of default values may be indicated for a second type of UE 120 (e.g., a reduced capability UE).

As shown in connection with reference number 710, the network node 405 may transmit, and the UE 120 may receive, information associated with the network node 405. For example, the network node 405 may transmit, and the UE 120 may receive, information that indicates the whether the network node 405 is a TN node or an NTN node, an orbit type associated with the network node 405, or a coverage type associated with the network node 405, among other examples.

In some aspects, the network node 405 may transmit an indication of which default value or set of default values is to be used for the radio parameter. For example, the network node 405 may transmit, and the UE 120 may receive, an indication of which default value or set of default values is to be used for the radio parameter. In some aspects, the network node 405 may transmit SIB signaling, RRC information, random access response (RAR) information, MAC information (e.g., a MAC control element (MAC-CE)), or downlink control information (DCI) that indicates the default value or set of default values to be used for the radio parameter.

As shown in connection with reference number 715, the UE 120 may transmit, and the network node 405 may receive, a communication that is based at least in part on the default value for the radio parameter. For example, the UE 120 may select the default value for the radio parameter, such as a timer expiration parameter. The UE 120 may transmit a communication, such as a communication associated with random access triggering, based at least in part on an expiration of the timer that is configured with the default value for the timer expiration.

As indicated above, FIG. 7 is provided as an example. Other examples may differ from what is described with regard to FIG. 7.

Figure 8:
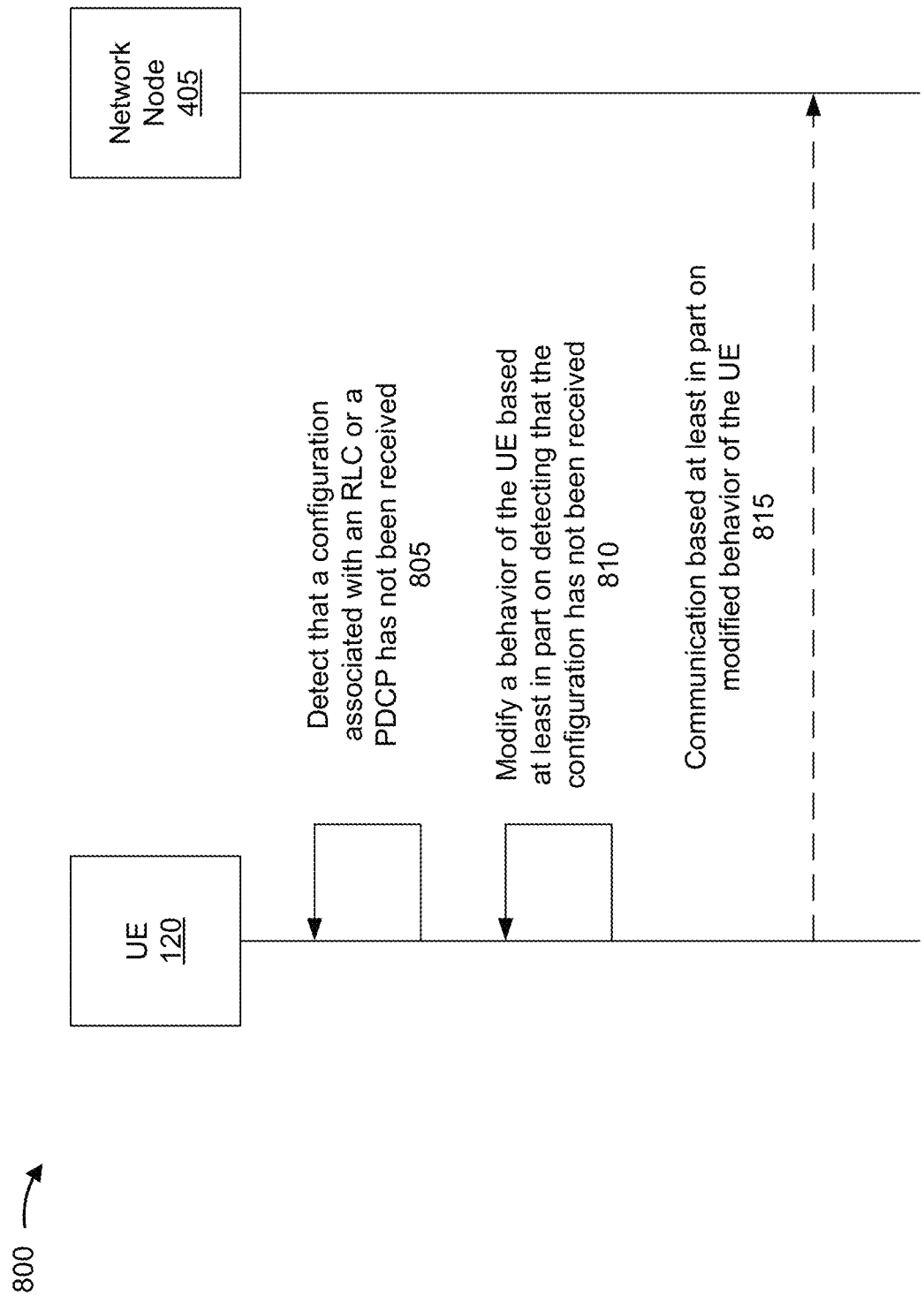
FIG. 8 is a diagram illustrating an example associated with UE behavior modification based at least in part on the default value, in accordance with the present disclosure.

FIG. 8 is a diagram illustrating an example 800 UE behavior modification based at least in part on the default value, in accordance with the present disclosure. The UE 120 may communicate with the network node 405. The network node 405 may be a TN node or an NTN node, among other examples.

As shown in connection with reference number 805, the UE 120 may detect that a configuration that includes an RRC configuration, an SDAP configuration, a PDCP configuration, an RLC configuration, a MAC configuration, or a physical layer configuration for communicating with an NTN node has not been received.

As described herein, the default value for the radio parameter may be used when the network does not provide an explicit configuration. In some aspects, the network node 405 may be configured to provide (e.g., may be mandated to provide) the UE 120 with an RRC configuration, an SDAP configuration, a PDCP configuration, an RLC configuration, a MAC configuration, or a physical layer configuration. In some aspects, the network node 405 may be configured to provide the RRC, SDAP, PDCP, RLC, MAC, or physical layer configuration only under certain circumstances. For example, the network node 405 may be configured to provide the RRC, SDAP, PDCP, RLC, MAC, or physical layer configuration for certain orbit types where the default values are likely to be too short. In another example, the network node 405 may be configured to provide only the RRC configuration only, only the SDAP configuration, only the PDCP configuration, only the RLC configuration, only the MAC configuration, or only the physical layer configuration based at least in part on the network node type, the orbit type, or the coverage type, among other examples.

In some aspects, the UE 120 may consider an error to have occurred based at least in part on detecting that the configuration that includes an RRC configuration, an SDAP configuration, a PDCP configuration, an RLC configuration, a MAC configuration, or a physical layer configuration for communicating with an NTN node has not been received. For example, the UE 120 may be configured to trigger an RRC re-establishment procedure based at least in part on detecting that the configuration has not been received. In another example, the UE 120 may be configured to abandon a current procedure, and notify an upper layer of the abandoned procedure, based at least in part on detecting that the configuration has not been received. In another example, the UE 120 may discard an RRC message and initiate another procedure (e.g., an RRC connection request or resume procedure) based at least in part on detecting that the configuration has not been received. However, as described above, this may result in increased network overhead or communication disruptions between the UE 120 and the network node 405.

As shown in connection with reference number 810, the UE 120 may modify a behavior of the UE 120 based at least in part on detecting that the configuration has not been received. For example, the UE 120 may modify a behavior of the UE 120 in order to avoid the increased network overhead or the communication disruptions.

In some aspects, the UE 120 may not start the retransmission BSR timer until the configuration is received. For example, the UE 120 may not start the retransmission BSR timer until Msg4, RRC setup, RRC resume, or RRC configuration information has been received. In some aspects, the UE 120 may not trigger a regular BSR due to the retransmission BSR timer until the configuration is received. For example, the UE 120 may not trigger the regular BSR due to the retransmission BSR timer until Msg4, RRC setup, RRC resume, or RRC configuration information has been received. In some aspects, the UE 120 may cancel a regular BSR transmission due to the retransmission BSR timer until the configuration is received. For example, the UE 120 may cancel the regular BSR transmission due to the retransmission BSR timer until Msg4, RRC setup, RRC resume, or RRC configuration information has been received.

In some aspects, the UE 120 may not trigger a scheduling request due to the retransmission BSR timer until the configuration has been received. For example, the UE 120 may not trigger the scheduling request due to the retransmission BSR timer until Msg4, RRC setup, RRC resume, or RRC configuration information has been received. In some aspects, the UE 120 may cancel a scheduling request due to the retransmission BSR timer until the configuration has been received. For example, the UE 120 may cancel the scheduling request due to the retransmission BSR timer until Msg4, RRC setup, RRC resume, or RRC configuration information has been received.

In some aspects, the UE 120 may determine that there is no data available for transmission, after a Msg3 (e.g., common control channel service data unit) transmission, until the configuration has been received. For example, the UE 120 may determine that there is no data available for transmission, after the Msg3 transmission, until Msg4, RRC setup, RRC resume, or RRC configuration information has been received. In some aspects, the UE 120 may prioritize an existing (e.g., ongoing) random access procedure until the configuration has been received. For example, the UE 120 may prioritize the existing random access procedure until Msg4, RRC setup, RRC resume, or RRC configuration information has been received.

As shown in connection with reference number 815, the UE 120 may transmit, and the network node 405 may receive, a communication that is based at least in part on the modified behavior of the UE 120. For example, the UE 120 may transmit the communication (or not transmit the communication) based at least in part on the modified behavior, such as based at least in part on not starting the retransmission BSR timer, not triggering a regular BSR transmission, canceling a regular BSR transmission, not triggering a scheduling request, or canceling a scheduling request, among other examples.

As described above, the default values configured for TN communications may not be suitable for NTN communications. This may result in increased network overhead and/or communication disruptions between the UE 120 and the network node 405. Using the techniques and apparatuses described herein, the UE 120 may modify a behavior of the UE 120 based at least in part on detecting that a PDCP configuration, an RLC configuration, or a MAC configuration has not been received. This may decrease a likelihood of wasted network resources and communication disruptions.

As indicated above, FIG. 8 is provided as an example. Other examples may differ from what is described with regard to FIG. 8.

Figure 9:
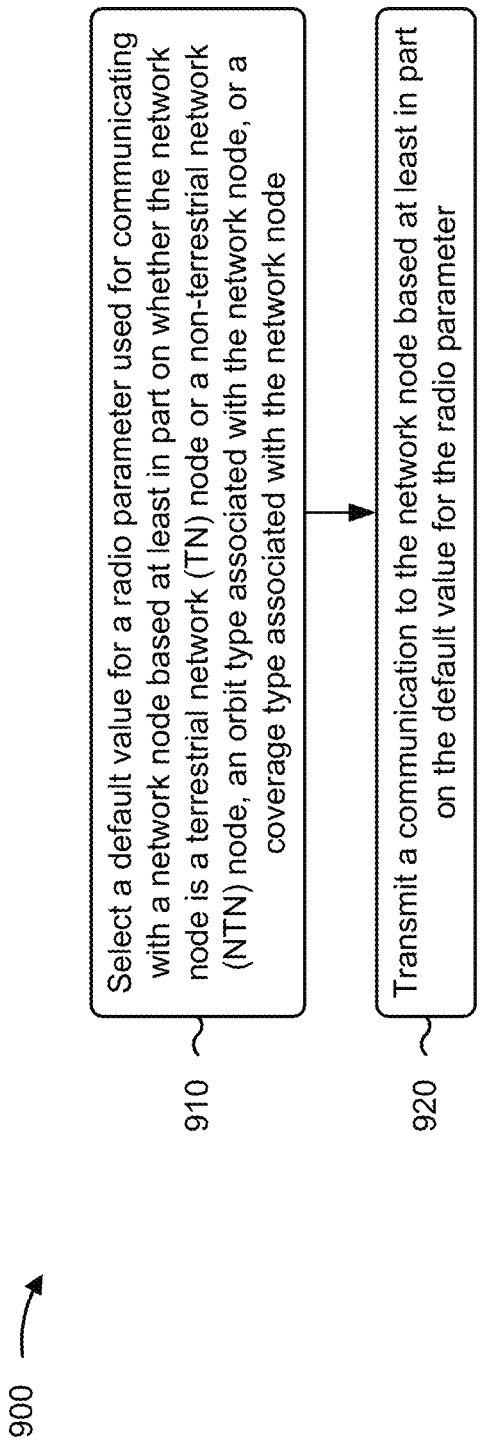
FIG. 9 is a diagram illustrating an example process associated with NTN default value configuration, in accordance with the present disclosure.

FIG. 9 is a diagram illustrating an example process 900 performed, for example, by a UE, in accordance with the present disclosure. Example process 900 is an example where the UE (e.g., UE 120) performs operations associated with NTN default value configuration.

As shown in FIG. 9, in some aspects, process 900 may include selecting a default value for a radio parameter used for communicating with a network node based at least in part on whether the network node is a TN node or an NTN node, an orbit type associated with the network node, or a coverage type associated with the network node (block 910). For example, the UE (e.g., using communication manager 140 and/or selection component 1108, depicted in FIG. 11) may select a default value for a radio parameter used for communicating with a network node based at least in part on whether the network node is a TN node or an NTN node, an orbit type associated with the network node, or a coverage type associated with the network node, as described above.

As further shown in FIG. 9, in some aspects, process 900 may include transmitting a communication to the network node based at least in part on the default value for the radio parameter (block 920). For example, the UE (e.g., using communication manager 140 and/or transmission component 1104, depicted in FIG. 11) may transmit a communication to the network node based at least in part on the default value for the radio parameter, as described above.

Process 900 may include additional aspects, such as any single aspect or any combination of aspects described below and/or in connection with one or more other processes described elsewhere herein.

In a first aspect, process 900 includes identifying whether the network node is a TN node or an NTN node based at least in part on a latency value, an indication from the network node, or an implicit indication.

In a second aspect, alone or in combination with the first aspect, the latency value indicates that the network node is the TN node based at least in part on the latency value being less than a latency threshold or that the network node is the NTN node based at least in part on the latency value being greater than the latency threshold, wherein the indication from the network node is an explicit indication that indicates whether the network node is a TN node or an NTN node, and wherein the implicit indication is based at least in part on system information block information or timing information.

In a third aspect, alone or in combination with one or more of the first and second aspects, process 900 includes identifying the orbit type associated with the network node based at least in part on a latency value, an indication from the network node, or an implicit indication.

In a fourth aspect, alone or in combination with one or more of the first through third aspects, the latency value is identified from a plurality of latency values corresponding to a plurality of orbit types associated with the network node, wherein the indication from the network node is an explicit indication that indicates the orbit type associated with network node, and wherein the implicit indication is based at least in part on system information block information or timing information.

In a fifth aspect, alone or in combination with one or more of the first through fourth aspects, identifying the orbit type comprises identifying a geostationary earth orbit type, a highly elliptical orbit type, a medium earth orbit type, a low earth orbit type, a high-altitude platform station orbit type, a geosynchronous orbit type, or a non-geosynchronous orbit type.

In a sixth aspect, alone or in combination with one or more of the first through fifth aspects, process 900 includes identifying the coverage type associated with the network node based at least in part on an out-of-sync value, an indication from the network node, or an implicit indication.

In a seventh aspect, alone or in combination with one or more of the first through sixth aspects, the out-of-sync value indicates that the network node is the TN node based at least in part on the out-of-sync value being less than an out-of-sync threshold or that the network node is the NTN node based at least in part on the out-of-sync value being greater than the out-of-sync threshold, wherein the indication from the network node is an explicit indication that indicates the coverage type associated with the network node, and wherein the implicit indication is based at least in part on the orbit type associated with network node.

In an eighth aspect, alone or in combination with one or more of the first through seventh aspects, the coverage type is a continuous coverage type or a discontinuous coverage type.

In a ninth aspect, alone or in combination with one or more of the first through eighth aspects, process 900 includes obtaining information that indicates a plurality of default values for the radio parameter.

In a tenth aspect, alone or in combination with one or more of the first through ninth aspects, process 900 includes obtaining information that indicates the default value for the radio parameter and an offset to be applied to the default value for the radio parameter.

In an eleventh aspect, alone or in combination with one or more of the first through tenth aspects, process 900 includes obtaining information that indicates the default value for the radio parameter and a scaling factor to be applied to the default value for the radio parameter.

In a twelfth aspect, alone or in combination with one or more of the first through eleventh aspects, selecting the default value for the radio parameter comprises obtaining (e.g., receiving from the network node) an indication of the default value to be used for the radio parameter.

In a thirteenth aspect, alone or in combination with one or more of the first through twelfth aspects, the indication of the default value to be used for the radio parameter is based at least in part on a type of the UE.

In a fourteenth aspect, alone or in combination with one or more of the first through thirteenth aspects, process 900 includes receiving, from the network node, a system information block message, a radio resource control message, a random access response message, a medium access control message, or downlink control information that includes information that indicates the default value to be used for the radio parameter, and selecting the default value for the radio parameter based at least in part on the information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
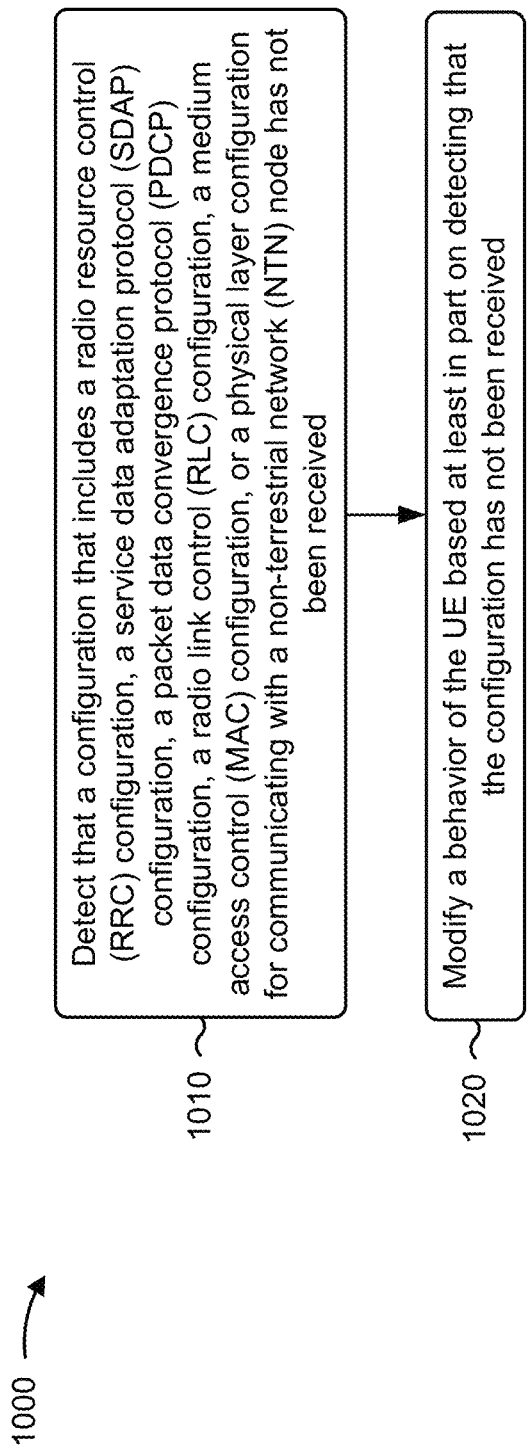
FIG. 10 is a diagram illustrating an example process associated with UE behavior modification based at least in part on the default value, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with NTN default value configuration.

As shown in FIG. 10, in some aspects, process 1000 may include detecting that a configuration that includes an RRC configuration, an SDAP configuration, a PDCP configuration, an RLC configuration, a MAC configuration, or a physical layer configuration for communicating with an NTN node has not been received (block 1010). For example, the UE (e.g., using communication manager 140 and/or detection component 1114, depicted in FIG. 11) may detect that a configuration that includes an RRC configuration, an SDAP configuration, a PDCP configuration, an RLC configuration, a MAC configuration, or a physical layer configuration for communicating with an NTN node has not been received, as described above.

As further shown in FIG. 10, in some aspects, process 1000 may include modifying a behavior of the UE based at least in part on detecting that the configuration has not been received (block 1020). For example, the UE (e.g., using communication manager 140 and/or modification component 1116, depicted in FIG. 11) may modify a behavior of the UE based at least in part on detecting that the configuration has not been received, as described above.

Process 1000 may include additional aspects, such as any single aspect or any combination of aspects described below and/or in connection with one or more other processes described elsewhere herein.

In a first aspect, detecting that the configuration has not been received comprises detecting that the configuration has not been received within a time period for detecting the configuration.

In a second aspect, alone or in combination with the first aspect, modifying the behavior of the UE comprises delaying an initiation of a retransmission buffer status report timer until the configuration has been received.

In a third aspect, alone or in combination with one or more of the first and second aspects, modifying the behavior of the UE comprises delaying a buffer status report triggering associated with a retransmission buffer status report timer until the configuration has been received.

In a fourth aspect, alone or in combination with one or more of the first through third aspects, modifying the behavior of the UE comprises canceling one or more buffer status report transmissions associated with a retransmission buffer status report timer until the configuration has been received.

In a fifth aspect, alone or in combination with one or more of the first through fourth aspects, modifying the behavior of the UE comprises delaying a scheduling request associated with a retransmission buffer status report timer until the configuration has been received.

In a sixth aspect, alone or in combination with one or more of the first through fifth aspects, modifying the behavior of the UE comprises canceling one or more scheduling request transmissions associated with a retransmission buffer status report timer until the configuration has been received.

In a seventh aspect, alone or in combination with one or more of the first through sixth aspects, modifying the behavior of the UE comprises delaying a data transmission, canceling a data transmission, or considering a portion of the data transmission to not be available until the configuration has been received.

In an eighth aspect, alone or in combination with one or more of the first through seventh aspects, modifying the behavior of the UE comprises prioritizing an existing random access procedure at least until the configuration has been received.

In a ninth aspect, alone or in combination with one or more of the first through eighth aspects, modifying the behavior of the UE based at least in part on detecting that the configuration has not been received comprises modifying the behavior of the UE to reduce or eliminate continuous random access procedure triggering.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
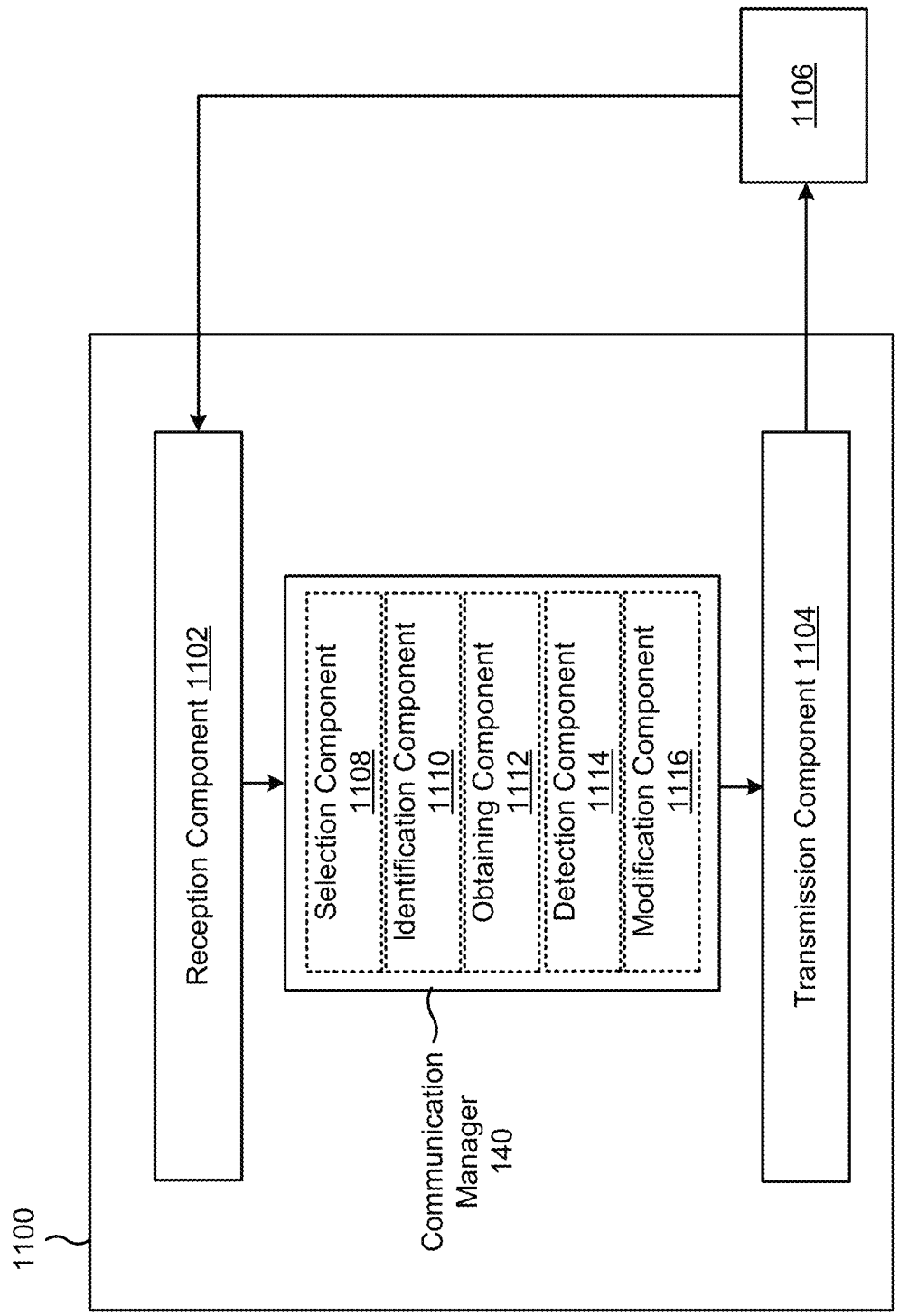
FIG. 11 is a diagram of an example apparatus for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a selection component 1108, an identification component 1110, an obtaining component 1112, a detection component 1114, or a modification component 1116, among other examples.

In some aspects, the apparatus 1100 may be configured to perform one or more operations described herein in connection with FIGS. 6-8. Additionally, or alternatively, the apparatus 1100 may be configured to perform one or more processes described herein, such as process 800 of FIG. 8, process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The selection component 1108 may select a default value for a radio parameter used for communicating with a network node based at least in part on whether the network node is a TN node or an NTN node, an orbit type associated with the network node, or a coverage type associated with the network node. The transmission component 1104 may transmit a communication to the network node based at least in part on the default value for the radio parameter.

The identification component 1110 may identify whether the network node is a TN node or an NTN node based at least in part on a latency value, an indication from the network node, or an implicit indication. The identification component 1110 may identify the orbit type associated with the network node based at least in part on a latency value, an indication from the network node, or an implicit indication. The identification component 1110 may identify the coverage type associated with the network node based at least in part on an out-of-sync value, an indication from the network node, or an implicit indication.

The obtaining component 1112 may obtain information that indicates a plurality of default values for the radio parameter. The obtaining component 1112 may obtain information that indicates the default value for the radio parameter and an offset to be applied to the default value for the radio parameter. The obtaining component 1112 may obtain information that indicates the default value for the radio parameter and a scaling factor to be applied to the default value for the radio parameter.

The reception component 1102 may receive, from the network node, a system information block message, a radio resource control message, a random access response message, a medium access control message, or downlink control information that includes information that indicates the default value to be used for the radio parameter. The selection component 1108 may select the default value for the radio parameter based at least in part on the information.

The detection component 1114 may detect that a configuration that includes an RRC configuration, an SDAP configuration, a PDCP configuration, an RLC configuration, a MAC configuration, or a physical layer configuration for communicating with an NTN node has not been received. The modification component 1116 may modify a behavior of the UE based at least in part on detecting that the configuration has not been received.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: selecting a default value for a radio parameter used for communicating with a network node based at least in part on whether the network node is a terrestrial network (TN) node or a non-terrestrial network (NTN) node, an orbit type associated with the network node, or a coverage type associated with the network node; and transmitting a communication to the network node based at least in part on the default value for the radio parameter.

Aspect 2: The method of Aspect 1, further comprising identifying whether the network node is a TN node or an NTN node based at least in part on a latency value, an indication from the network node, or an implicit indication.

Aspect 3: The method of Aspect 2, wherein the latency value indicates that the network node is the TN node based at least in part on the latency value being less than a latency threshold or that the network node is the NTN node based at least in part on the latency value being greater than the latency threshold, wherein the indication from the network node is an explicit indication that indicates whether the network node is a TN node or an NTN node, and wherein the implicit indication is based at least in part on system information block information or timing information.

Aspect 4: The method of any of Aspects 1-3, further comprising identifying the orbit type associated with the network node based at least in part on a latency value, an indication from the network node, or an implicit indication.

Aspect 5: The method of Aspect 4, wherein the latency value is identified from a plurality of latency values corresponding to a plurality of orbit types associated with the network node, wherein the indication from the network node is an explicit indication that indicates the orbit type associated with network node, and wherein the implicit indication is based at least in part on system information block information or timing information.

Aspect 6: The method of Aspect 4, wherein identifying the orbit type comprises identifying a geostationary earth orbit type, a highly elliptical orbit type, a medium earth orbit type, a low earth orbit type, a high-altitude platform station orbit type, a geosynchronous orbit type, or a non-geosynchronous orbit type.

Aspect 7: The method of any of Aspects 1-6, further comprising identifying the coverage type associated with the network node based at least in part on an out-of-sync value, an indication from the network node, or an implicit indication.

Aspect 8: The method of Aspect 7, wherein the out-of-sync value indicates that the network node is the TN node based at least in part on the out-of-sync value being less than an out-of-sync threshold or that the network node is the NTN node based at least in part on the out-of-sync value being greater than the out-of-sync threshold, wherein the indication from the network node is an explicit indication that indicates the coverage type associated with the network node, and wherein the implicit indication is based at least in part on the orbit type associated with network node.

Aspect 9: The method of Aspect 7, wherein the coverage type is a continuous coverage type or a discontinuous coverage type.

Aspect 10: The method of any of Aspects 1-9, further comprising obtaining information that indicates a plurality of default values for the radio parameter.

Aspect 11: The method of any of Aspects 1-10, further comprising obtaining information that indicates the default value for the radio parameter and an offset to be applied to the default value for the radio parameter.

Aspect 12: The method of any of Aspects 1-11, further comprising obtaining information that indicates the default value for the radio parameter and a scaling factor to be applied to the default value for the radio parameter.

Aspect 13: The method of any of Aspects 1-12, wherein selecting the default value for the radio parameter comprises obtaining (e.g., receiving from the network node) an indication of the default value to be used for the radio parameter.

Aspect 14: The method of Aspect 13, wherein the indication of the default value to be used for the radio parameter is based at least in part on a type of the UE.

Aspect 15: The method of any of Aspects 1-14, further comprising: receiving, from the network node, a system information block message, a radio resource control message, a random access response message, a medium access control message, or downlink control information that includes information that indicates the default value to be used for the radio parameter; and selecting the default value for the radio parameter based at least in part on the information.

Aspect 16: A method of wireless communication performed by a user equipment (UE), comprising: detecting that a configuration that includes a radio resource control (RRC) configuration, a service data adaptation protocol (SDAP) configuration, a packet data convergence protocol (PDCP) configuration, a radio link control (RLC) configuration, a medium access control (MAC) configuration, or a physical layer configuration for communicating with a non-terrestrial network (NTN) node has not been received.

Aspect 17: The method of Aspect 16, wherein detecting that the configuration has not been received comprises detecting that the configuration has not been received within a time period for detecting the configuration.

Aspect 18: The method of any of Aspects 16-17, wherein modifying the behavior of the UE comprises delaying an initiation of a retransmission buffer status report timer until the configuration has been received.

Aspect 19: The method of any of Aspects 16-18, wherein modifying the behavior of the UE comprises delaying a buffer status report triggering associated with a retransmission buffer status report timer until the configuration has been received.

Aspect 20: The method of any of Aspects 16-19, wherein modifying the behavior of the UE comprises canceling one or more buffer status report transmissions associated with a retransmission buffer status report timer until the configuration has been received.

Aspect 21: The method of any of Aspects 16-20, wherein modifying the behavior of the UE comprises delaying a scheduling request associated with a retransmission buffer status report timer until the configuration has been received.

Aspect 22: The method of any of Aspects 16-21, wherein modifying the behavior of the UE comprises canceling one or more scheduling request transmissions associated with a retransmission buffer status report timer until the configuration has been received.

Aspect 23: The method of any of Aspects 16-22, wherein modifying the behavior of the UE comprises delaying a data transmission, canceling a data transmission, or considering a portion of the data transmission to not be available until the configuration has been received.

Aspect 24: The method of any of Aspects 16-23, wherein modifying the behavior of the UE comprises prioritizing an existing random access procedure until the configuration has been received.

Aspect 25: The method of any of Aspects 16-24, wherein modifying the behavior of the UE based at least in part on detecting that the configuration has not been received comprises modifying the behavior of the UE to reduce or eliminate continuous random access procedure triggering.

Aspect 26: An apparatus for wireless communication at a device, comprising a processor; memory coupled with the processor; and instructions stored in the memory and executable by the processor to cause the apparatus to perform the method of one or more of Aspects 1-15.

Aspect 27: A device for wireless communication, comprising a memory and one or more processors coupled to the memory, the one or more processors configured to perform the method of one or more of Aspects 1-15.

Aspect 28: An apparatus for wireless communication, comprising at least one means for performing the method of one or more of Aspects 1-15.

Aspect 29: A non-transitory computer-readable medium storing code for wireless communication, the code comprising instructions executable by a processor to perform the method of one or more of Aspects 1-15.

Aspect 30: A non-transitory computer-readable medium storing a set of instructions for wireless communication, the set of instructions comprising one or more instructions that, when executed by one or more processors of a device, cause the device to perform the method of one or more of Aspects 1-15.

Aspect 31: An apparatus for wireless communication at a device, comprising a processor; memory coupled with the processor; and instructions stored in the memory and executable by the processor to cause the apparatus to perform the method of one or more of Aspects 16-25.

Aspect 32: A device for wireless communication, comprising a memory and one or more processors coupled to the memory, the one or more processors configured to perform the method of one or more of Aspects 16-25.

Aspect 33: An apparatus for wireless communication, comprising at least one means for performing the method of one or more of Aspects 16-25.

Aspect 34: A non-transitory computer-readable medium storing code for wireless communication, the code comprising instructions executable by a processor to perform the method of one or more of Aspects 16-25.

Aspect 35: A non-transitory computer-readable medium storing a set of instructions for wireless communication, the set of instructions comprising one or more instructions that, when executed by one or more processors of a device, cause the device to perform the method of one or more of Aspects 16-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive information indicating a plurality of default values for a radio parameter;
      select a default value, from the plurality of default values, for the radio parameter, used for communicating with a network node, comprising a non-terrestrial network (NTN) node, wherein the default value is based at least in part on an orbit type associated with the network node and a coverage type associated with the network node, wherein the default value corresponds to a timer; and
      transmit a communication based at least in part on the default value for the radio parameter.

2. The apparatus of claim 1, wherein the one or more processors are further configured to identify that the network node is an NTN node based at least in part on a latency value, an indication from the network node, or an implicit indication.

3. The apparatus of claim 2, wherein the latency value indicates that the network node is the NTN node based at least in part on the latency value being greater than a latency threshold, wherein the indication from the network node is an explicit indication that indicates that the network node is an NTN node, and wherein the implicit indication is based at least in part on system information block information or timing information.

4. The apparatus of claim 1, wherein the one or more processors are further configured to identify the orbit type associated with the network node based at least in part on a latency value, an indication from the network node, or an implicit indication.

5. The apparatus of claim 4, wherein the latency value is identified from a plurality of latency values corresponding to a plurality of orbit types associated with the network node, wherein the indication from the network node is an explicit indication that indicates the orbit type associated with network node, and wherein the implicit indication is based at least in part on system information block information or timing information.

6. The apparatus of claim 4, wherein the one or more processors, to identify the orbit type, are configured to identify a geostationary earth orbit type, a highly elliptical orbit type, a medium earth orbit type, a low earth orbit type, a high-altitude platform station orbit type, a geosynchronous orbit type, or a non-geosynchronous orbit type.

7. The apparatus of claim 1, wherein the one or more processors are further configured to identify the coverage type associated with the network node based at least in part on an out-of-sync value, an indication from the network node, or an implicit indication.

8. The apparatus of claim 7, wherein the out-of-sync value indicates that the network node is the NTN node based at least in part on an out-of-sync value being greater than an out-of-sync threshold, wherein the indication from the network node is an explicit indication that indicates the coverage type associated with the network node, and wherein the implicit indication is based at least in part on the orbit type associated with network node.

9. The apparatus of claim 7, wherein the coverage type is a continuous coverage type or a discontinuous coverage type.

10. The apparatus of claim 1, wherein the one or more processors are further configured to obtain information that indicates the default value for the radio parameter and an offset to be applied to the default value for the radio parameter.

11. The apparatus of claim 1, wherein the one or more processors are further configured to obtain information that indicates the default value for the radio parameter and a scaling factor to be applied to the default value for the radio parameter.

12. The apparatus of claim 1, wherein the one or more processors, to select the default value for the radio parameter, are configured to obtain an indication of the default value to be used for the radio parameter.

13. The apparatus of claim 12, wherein the indication of the default value to be used for the radio parameter is based at least in part on a type of the UE.

14. The apparatus of claim 1, wherein the timer comprises a buffer status report (BSR) timer, a poll retransmit timer, or a reassembly timer.

15. The apparatus of claim 1, wherein the one or more processors, to select the default value, are further configured to:
   select a first value for the timer based at least in part on the network node being a NTN node; or
   select a second value for the timer based at least in part on the network node being a TN node.

16. The apparatus of claim 15, wherein the first value is greater than the second value.

17. The apparatus of claim 1, wherein the one or more processors are configured to:
   receive the information indicating the plurality of default values via system information block (SIB) signaling, radio resource control (RRC) signaling, random access response (RAR) information, medium access control (MAC) signaling information, or downlink control information (DCI) signaling.

18. A method of wireless communication performed by a user equipment (UE), comprising:
   receiving information indicating a plurality of default values for a radio parameter;
   selecting a default value, from the plurality of default values, for the radio parameter, used for communicating with a network node, comprising a non-terrestrial network (NTN) node, wherein the default value is based at least in part on an orbit type associated with the network node and a coverage type associated with the network node, wherein the default value corresponds to a timer; and
   transmitting a communication based at least in part on the default value for the radio parameter.

19. The method of claim 18, further comprising identifying that the network node is an NTN node based at least in part on a latency value, an indication from the network node, or an implicit indication.

20. The method of claim 19, wherein the latency value indicates that the network node is the NTN node based at least in part on the latency value being greater than a latency threshold, wherein the indication from the network node is an explicit indication that indicates that the network node is an NTN node, and wherein the implicit indication is based at least in part on system information block information or timing information.

21. The method of claim 18, further comprising identifying the orbit type associated with the network node based at least in part on a latency value, an indication from the network node, or an implicit indication.

22. The method of claim 21, wherein the latency value is identified from a plurality of latency values corresponding to a plurality of orbit types associated with the network node, wherein the indication from the network node is an explicit indication that indicates the orbit type associated with network node, and wherein the implicit indication is based at least in part on system information block information or timing information.

23. The method of claim 21, wherein identifying the orbit type further comprises:
    identifying a geostationary earth orbit type, a highly elliptical orbit type, a medium earth orbit type, a low earth orbit type, a high-altitude platform station orbit type, a geosynchronous orbit type, or a non-geosynchronous orbit type.

24. The method of claim 18, further comprising identifying the coverage type associated with the network node based at least in part on an out-of-sync value, an indication from the network node, or an implicit indication.

25. The method of claim 24, wherein the out-of-sync value indicates that the network node is the NTN node based at least in part on the out-of-sync value being greater than an out-of-sync threshold, wherein the indication from the network node is an explicit indication that indicates the coverage type associated with the network node, and wherein the implicit indication is based at least in part on the orbit type associated with network node.

26. The method of claim 25, wherein the coverage type is a continuous coverage type or a discontinuous coverage type.

27. The method of claim 18, further comprising:
    obtaining information that indicates the default value for the radio parameter and an offset to be applied to the default value for the radio parameter.

28. The method of claim 18, further comprising:
    receiving the information indicating the plurality of default values via system information block (SIB) signaling, radio resource control (RRC) signaling, random access response (RAR) information, medium access control (MAC) signaling information, or downlink control information (DCI) signaling.

29. A non-transitory computer-readable medium storing one or more instructions for wireless communication, the one or more instructions, when executed by one or more processors of a user equipment (UE), cause the UE to:
    receive information indicating a plurality of default values for a radio parameter;
    select a default value, from the plurality of default values, for the radio parameter, used for communicating with a network node, comprising a non-terrestrial network (NTN) node, wherein the default value is based at least in part on an orbit type associated with the network node and a coverage type associated with the network node, wherein the default value corresponds to a timer; and
    transmit a communication based at least in part on the default value for the radio parameter.

30. An apparatus for wireless communication, comprising:
    means for receiving information indicating a plurality of default values for a radio parameter;
    means for selecting a default value for a radio parameter, corresponding to a timer, used for communicating with a network node, comprising a non-terrestrial network (NTN) node, wherein the default value is based at least in part on an orbit type associated with the network node and a coverage type associated with the network node, wherein the default value corresponds to a timer; and
    means for transmitting a communication based at least in part on the default value for the radio parameter.

* * * * *